United States Patent [19]

Nguyen et al.

[11] Patent Number: 5,762,757
[45] Date of Patent: Jun. 9, 1998

[54] METHODS FOR INHIBITING ORGANIC CONTAMINANT DEPOSITION IN PULP AND PAPERMAKING SYSTEMS

[75] Inventors: Duy T. Nguyen; J. Barry Wright; Daniel Michalopoulos, all of Jacksonville, Fla.

[73] Assignee: BetzDearborn Inc., Trevose, Pa.

[21] Appl. No.: 761,110

[22] Filed: Dec. 5, 1996

[51] Int. Cl.⁶ .................................................. D21H 17/04
[52] U.S. Cl. .......................... 162/158; 162/164.5; 162/173; 162/DIG. 3; 162/DIG. 4; 162/199
[58] Field of Search .................................. 162/158, 199, 162/DIG. 3, DIG. 4, 72, 77, 173, 164.5

[56] References Cited

U.S. PATENT DOCUMENTS

| | | | |
|---|---|---|---|
| 3,582,461 | 6/1971 | Lipowski et al. | 162/72 |
| 4,107,073 | 8/1978 | Maciaszek | 252/321 |
| 4,184,912 | 1/1980 | Payton | 162/72 |
| 4,190,491 | 2/1980 | Drennan et al. | 162/76 |
| 4,608,123 | 8/1986 | Leahy | 162/146 |
| 4,744,865 | 5/1988 | Dreisbach et al. | 162/168.1 |
| 4,765,867 | 8/1988 | Dreisbach et al. | 162/72 |
| 4,995,944 | 2/1991 | Aston et al. | 162/199 |
| 5,071,961 | 12/1991 | Dreisbach et al. | 162/72 |
| 5,223,097 | 6/1993 | Hassler | 162/161 |
| 5,234,544 | 8/1993 | Naddeo | 162/5 |
| 5,266,166 | 11/1993 | Dreisbach et al. | 162/199 |
| 5,300,194 | 4/1994 | Velkener et al. | 162/199 |

FOREIGN PATENT DOCUMENTS

| | | |
|---|---|---|
| 1136032 | 11/1981 | Canada. |
| 1150914 | 8/1983 | Canada. |
| 0280445 | 8/1988 | European Pat. Off.. |

OTHER PUBLICATIONS

Pulp and Paper, James Casey, vol. III, 3d. Ed., pp. 1587–1588.

*Primary Examiner*—Peter Chin
*Assistant Examiner*—Steven B. Leavitt
*Attorney, Agent, or Firm*—Alexander D. Ricci; Philip H. Von Neida

[57] ABSTRACT

Compositions and methods for inhibiting the deposition of organic contaminants from pulp in pulp and papermaking systems are disclosed. The methods add to the pulp or to the deposition prone surface of the papermaking systems a composition comprising a dinonyl sulfosuccinate anionic surfactant which is used in systems containing multivalent cations, preferably calcium ions. The methods also utilize a blend of dioctyl sulfosuccinate and didecyl sulfosuccinate anionic surfactants.

11 Claims, No Drawings

METHODS FOR INHIBITING ORGANIC CONTAMINANT DEPOSITION IN PULP AND PAPERMAKING SYSTEMS

FIELD OF THE INVENTION

The present invention relates to compositions and methods for inhibiting the deposition of organic contaminants in pulp and papermaking systems.

BACKGROUND OF THE INVENTION

The deposition of organic contaminants in the pulp and papermaking industry can cause both quality and efficiency problems in pulp and papermaking systems. Some components occur naturally in wood and are released during various pulping and papermaking processes. The term "pitch" can be used to refer to deposits composed of organic constituents which may originate from these natural resins, their salts, as well as coating binders, sizing agents, and defoaming chemicals which may be found in the pulp. In addition, pitch frequently contains inorganic components such as calcium carbonate, talc, clays, titanium and related materials.

Stickies is a term that has been increasingly used to describe deposits that occur in the systems using recycled fiber. These deposits often contain the same materials found in "pitch" deposits in addition to adhesives, hot melts, waxes, and inks. All of the aforementioned materials have many common characteristics including: hydrophobicity, defoamability, tackiness, low surface energy, and the potential to cause problems with deposition, quality, and efficiency in the process. Diagram I shows the complex relationship between pitch and stickies discussed here.

DIAGRAM 1

| | Pitch | Stickies |
|---|---|---|
| Natural Resins (fatty and resin acids, fatty esters, insoluble salts, sterols, etc.) | X | X |
| Defoamers (oil, EBS, silicate, silicone oils, ethoxylated compounds, etc.) | X | X |
| Sizing Agents (Rosin size, ASA, AKD, hydrolysis products, insoluble salts, etc.) | X | X |
| Coating Binders (PVAC, SBR) | X | X |
| Waxes | | X |
| Inks | | X |
| Hot Melts (EVA, PVAC, etc.) | | X |
| Contact Adhesives (SBR, vinyl acrylates, polyisoprene, etc.) | | X |

The deposition of organic contaminants can be detrimental to the efficiency of a pulp or paper mill causing both reduced quality and reduced operating efficiency. Organic contaminants can deposit on process equipment in papermaking systems resulting in operational difficulties in the systems. The deposition of organic contaminants on consistency regulators and other instrument probes can render these components useless. Deposits on screens can reduce throughput and upset operation of the system. This deposition can occur not only on metal surfaces in the system, but also on plastic and synthetic surfaces such as machine wires, felts, foils, Uhle boxes and headbox components.

Historically, the subsets of the organic deposit problems, "pitch" and "stickies" have manifested themselves separately, differently and have been treated distinctly and separately. From a physical standpoint, "pitch" deposits have usually formed from microscopic particles of adhesive material (natural or man-made) in the stock which accumulate on papermaking or pulping equipment. These deposits can readily be found on stock chest walls, paper machine foils, Uhle boxes, paper machine wires, wet press felts, dryer felts, dryer cans, and calendar stacks. The difficulties related to these deposits included direct interference with the efficiency of the contaminated surface, therefore, reduced production, as well as holes, dirt, and other sheet defects that reduce the quality and usefulness of the paper for operations that follow like coating, converting or printing.

From a physical standpoint, "stickies" have usually been particles of visible or nearly visible size in the stock which originate from the recycled fiber. These deposits tend to accumulate on many of the same surfaces that "pitch" can be found on and causes many of the same difficulties that "pitch" can cause. The most severe "stickies" related deposits however tend to be found on paper machine wires, wet felts, dryer felts and dryer cans.

Methods of preventing the build-up of deposits on the pulp and papermill equipment and surfaces are of great importance to the industry. The paper machines could be shut down for cleaning, but ceasing operation for cleaning is undesirable because of the consequential loss of productivity, poor quality while partially contaminated and "dirt" which occurs when deposits break off and become incorporated in the sheet. Preventing deposition is thus greatly preferred where it can be effectively practiced.

In the past stickies deposits and pitch deposits have typically manifested themselves in different systems. This was true because mills usually used only virgin fiber or only recycled fiber. Often very different treatment chemicals and strategies were used to control these separate problems.

Current trends are for increased mandatory use of recycled fiber in all systems. This is resulting in a co-occurrence of stickies and pitch problems in a given mill. It is desirable to find treatment chemicals and strategies which will be highly effective at eliminating both of these problems without having to feed two or more separate chemicals. The materials of this invention have clearly shown their ability to achieve this goal.

SUMMARY OF THE INVENTION

The present invention provides for compositions and methods for inhibiting the deposition of organic contaminants, such as pitch and stickies, in pulp and papermaking systems. The methods comprise adding to the pulp or the surfaces of papermaking machinery an effective deposition inhibiting amount of a dinonyl sulfosuccinate anionic surfactant, or a combination of dioctyl sulfosuccinate and didecyl sulfosuccinate anionic surfactants.

The invention further comprises a composition of a multivalent cation and a dinonyl sulfosuccinate anionic surfactant which demonstrates enhanced activity at inhibiting the deposition of organic contaminants when added to pulp and papermaking systems.

DESCRIPTION OF THE RELATED ART

U.S. Pat. No. 4,184,912 teaches methods for controlling pitch deposition from pulp in papermaking systems using a three component composition which comprises a nonionic surfactant, an anionic dispersant and anionic polymer having a molecular weight less than 100,000.

The '912 patent suggests that suitable anionic surfactants are selected from a variety of surfactants which includes sodium dialkyl sulfosuccinate. However, there is no demonstration that the anionic surfactant or any particular sodium dialkyl sulfosuccinate would be effective at inhibiting pitch by itself.

DETAILED DESCRIPTION OF THE INVENTION

The present invention relates to compositions and methods for inhibiting the deposition of organic contaminants from pulp on the surfaces of papermaking machinery in pulp and papermaking systems comprising adding to the pulp or applying to the surfaces of the papermaking machinery an effective deposition inhibiting amount of a dinonyl sulfosuccinate anionic surfactant, or a combination of dioctyl sulfosuccinate and didecyl sulfosuccinate anionic surfactants.

The present invention also relates to a composition useful for inhibiting the deposition of organic contaminants comprising a dinonyl sulfosuccinate anionic surfactant and a multivalent cation.

Organic contaminants include constituents which occur in the pulp (virgin, recycled or combinations thereof) having the potential to deposit and reduce paper machine performance or paper quality. These contaminants include but are not limited to natural resins such as fatty acids, resin acids, their insoluble salts, fatty esters, sterols and other organic constituents such as ethylene bis-stearamide, waxes, sizing agents, adhesives, hot melts, inks, defoamers, and latexes which may deposit in papermaking systems.

Surprisingly, it has been found that of the dialkyl sulfosuccinates tested, the dinonyl sulfosuccinates show the best performance for inhibiting stickies/pitch. Furthermore, the presence of multivalent cations such as calcium was showed to increase its efficacy significantly. The multivalent cations are selected from the group consisting of but not limited to calcium, magnesium and barium. Accordingly, it is possible to produce a highly efficacious inhibitor for use in pulp and papermaking systems.

The weight ratio of dinonyl sulfosuccinate anionic surfactant to multivalent cation ranges from about 1:4 to about 1:100. Preferably this weight ratio is in the range of about 1:10 to about 1:80.

The combination of dioctyl sulfosuccinate and didecyl sulfosuccinate anionic surfactants is effective at inhibiting the deposition of organic contaminants at weight/weight ratios ranging from about 2:1 to 4:1.

The compositions of the present invention are effective at inhibiting the deposition of organic contaminants in papermaking systems. This may include Kraft, acid sulfite, mechanical pulp and recycled fiber systems. For example, deposition in the brown stock washer, screen room and Decker system in Kraft papermaking processes can be inhibited. The term "papermaking systems" is meant to include all pulp processes. Generally, it is thought that these compositions can be utilized to inhibit deposition on all surfaces of the papermaking system from the pulp mill to the reel of the paper machine, having a pH of about 3 to about 11, and under a variety of system conditions. More specifically, the dinonyl sulfosuccinate compositions effectively decrease the deposition not only on metal surfaces but also on plastic and synthetic surfaces such as machine wires, felts, foils, Uhle boxes, rolls and headbox components.

The compositions of the present invention may be used with other pulp and papermaking additives which include but are not limited to starches, titanium dioxide, defoamers, wet strength resins and sizing aids.

The compositions of the present invention can be added to the paper-making system at any stage. They may be added directly to the pulp furnish or indirectly to the furnish through the headbox. The inventive compositions may also be sprayed onto surfaces that are suffering from deposition, such as the wire, press felts, press rolls and other deposition-prone surfaces.

The compositions of the present invention can be added to the papermaking system neat, as a powder, slurry or in solution; the preferred primary solvent being water but is not limited to such. When added by spraying techniques, the composition is preferably diluted with water to a satisfactory inhibitor concentration. The compositions may be added specifically and only to a furnish identified as contaminated or may be added to blended pulps. The compositions may be added to the stock at any point prior to the manifestation of the deposition problem and at more than one site when more than one deposition site occurs. Combinations of the above additive methods may also be employed by feeding the pulp millstock, feeding to the paper machine furnish, and spraying on the wire and the felt simultaneously.

For purposes of the present invention, the term "an effective deposition inhibiting amount" is defined as that amount which is sufficient to inhibit deposition in pulp and papermaking systems. The effective amount to be added to the papermaking system depends on a number of variables including the pH of the system, hardness of the water, temperature of the water, additional additives, and the organic contaminant type and content of the pulp. Generally, from about 0.5 parts to about 150 parts of the inventive composition per million parts of pulp is added to the papermaking system. Preferably, from about 2 parts to about 100 parts of the inventive composition are added per million parts of pulp in the system.

Further, the novel compositions have proven effective against both the pitch and stickies manifestation of organic deposition problems providing for an effective reduction of these problems in paper mills utilizing a variety of virgin and recycled fiber sources.

The data set forth below were developed to demonstrate the unexpected results occasioned by use of the present invention. The following are included as being illustrations of the present invention and should not be construed as limiting the scope thereof.

EXAMPLES

Surface Tension and Contact Angle Measurements

The Wilhelmy-type technique was used to obtain surface tensions and receding contact angles of a solid immersed in the solutions containing different treatments. The Kruss K-12 Tensiometer was used. The experiment was performed at room temperature (23° C.). Basically, a clean platinum plate with exactly known geometry is brought in contact with liquid and the force acting on the plate is measured via a microbalance. The surface tension of the liquid is calculated from the measured force:

$$\gamma = \frac{P}{L \times \cos \theta}$$

$\gamma$=surface tension
P=measured (Wilhelmy) force
L=wetted length
$\theta$ is the contact angle between the tangent at the wetting line and the plate surface. For the determination of the surface tension, the roughened and cleaned platinum plate is used and its contact angle is zero.

A polyester film was used as a solid substrate for contact angle measurements. This material was chosen because paper machine forming fabrics are frequently made of polyester which is susceptible to considerable deposition problems caused by stickies and/or pitch. Contact angle provides information about the hydrophobicity of a simulated stickies surface and the change in the hydrophobicity as surface-active materials are adsorbed and/or desorbed at the surface. A lower contact angle indicates that the surface is less susceptible to stickies and/or pitch deposition. A zero contact angle is preferred. Surface tension provides information about the surface activity of the surfactants. A lower surface tension indicates that the surfactant can emulsify and therefore stabilize the pitch dispersion more effectively. A stable dispersion will, in turn, minimize or prevent deposition. The results of this testing are reported in Table I.

TABLE I

Surface Tension and Contact Angle Measurements at 23° C.

| Sample | Conc. (ppm) | Surface Tension (dyne/cm) | Contact Angle Degree |
|---|---|---|---|
| Nanopure water | — | 72.2 | 53.3 |
| Tap water w/hardness about 300 ppm | — | 67.1 | 44.7 |
| Branched dinonyl sulfosuccinate in tap water | 1.5 | 35.5 | 0 |
| Branched dinonyl sulfosuccinate in tap water | 2.5 | 29.0 | 0 |
| Branched dinonyl sulfosuccinate in tap water | 5.0 | 26.2 | 0 |
| Branched dinonyl sulfosuccinate in nanopure water + 100 ppm CaCl$_2$ | 5.0 | 28.7 | 0 |
| Branched dinonyl sulfosuccinate in nanopure water | 2.5 | 46.8 | 28.8 |
| Ethoxylated nonyl phenol half ester of sulfosuccinic acid in tap water | 2.5 | 57.9 | 28.3 |
| Ethoxylated alcohol (C10–C12) half ester of sulfosuccinic acid tap water | 2.5 | 60.5 | 40.8 |
| Branched dioctyl sulfosuccinate in tap water | 5 | 44.0 | 16.2 |
| Southern Tissue Mill White Water (W.W) | — | 41.0 | 37.1 |
| Branched dinonyl sulfosuccinate in W.W | 1.5 | 31.8 | 48.5 |
| Branched dinonyl sulfosuccinate in W.W | 2.5 | 29.6 | 0 |
| Linear dinonyl sulfosuccinate in W.W | 1.5 | 33.9 | 0 |
| Linear dinonyl sulfosuccinate in W.W | 2.5 | 29.3 | 0 |
| Branched dioctyl sulfosuccinate in W.W | 2.5 | 39.8 | 41.4 |
| Linear dioctyl sulfosuccinate in W.W | 2.5 | 33.2 | 34.7 |
| Linear didecyl sulfosuccinate in W.W | 2.5 | 40.0 | 37.1 |
| Blend of linear dioctyl and didecyl sulfo-sulfosuccinates (4:1 by weight) | 2.5 | 34.9 | 0 |
| Blend of linear dioctyl and didecyl sulfo-sulfosuccinates (4:1 by weight) | 1.5 | 35.0 | 16.4 |
| Blend of linear dioctyl and didecyl sulfo-sulfosuccinates (2:1 by weight) | 2.5 | 34.0 | 11.5 |
| Polyvinyl alcohol (88% hydrolysis) | 2.5 | 43.1 | 32.3 |

When compared to other dialkyl sulfosuccinate surfactants, it can be seen that the branched and linear dinonyl sulfosuccinate surfactants and blends of dioctyl and didecyl sulfosuccinnates exhibit a much lower contact angle as well as surface tension than its homologues. The data imply that the dinonyl sulfosuccinates and blends of dioctyl and didecyl sulfosuccinates are an excellent detackifier and pitch stabilizer agent. The results presented in Table I also demonstrate that this surfactant forms complexes with multivalent cations such as calcium and can further lower the contact angle and surface tension significantly as compared to the monovalent ions such as sodium ions. These results also demonstrate synergism between blends of dioctyl sulfosuccinate and didecyl sulfosuccinate surfactants, particularly in weight/weight ratios of 2:1 to 4:1.

Standard Tape Detackification Test

In order to establish the efficacy of the inventive compositions as deposition control agents on plastic surfaces and specifically for adhesive contaminants of the sort found in recycled pulp, a laboratory test was developed utilizing adhesive-backed tapes as stickie coupons. The stickie coupon can be fabricated from any type of adhesive tape that will not disintegrate in water. For this study, tapes made from a styrenebutadiene rubber and vinylic esters were used. Both of these potential organic contaminants are known to cause stickies problems in secondary fiber utilization. A second coupon was fabricated from polyester film such as MYLAR®, a product marketed by DuPont Chemical Company. This material was chosen because paper machine forming fabrics are frequently made of polyester which is susceptible to considerable deposition problems caused by stickies and/or pitch.

This test involved immersing a 2"×4" adhesive tape and a 2"×4" polyester Mylar coupon into a 600 gram solution being tested. The solution contained in a 600 mL beaker is placed in a water bath with agitation and heated to the desired temperature. After 30 minutes of immersion, the tape and coupon are removed from the solution and pressed to 10,000 lb force for one minute. A tensile test instrument (Instron) is then used to measure the force required to pull the two apart. A reduction in the force required indicates that the "stickie" has been detackified. The % control or detackification is calculated by the following equation:

$$\% \text{ detackification} = \frac{(\text{Untreated force} - \text{treated force})}{\text{Untreated force}} \times 100$$

The results of this testing are presented in Table II.

TABLE II

Standard Tape Detackification Test at 23° C.

| Sample | Contact Time (min) | Dosage (ppm) | Peel Force (lbf) | % |
|---|---|---|---|---|
| Nanopure Water | 30 | — | 4.49 | |
| Tap water with about 300 ppm hardness | 30 | — | 2.20 | |
| Nanopure water + 100 ppm CaCl$_2$ | 30 | 5 | 4.60 | |
| Dinonyl sulfosuccinate in nanopure water | 30 | 2.5 | 2.93 | 35 |
| Dinonyl sulfosuccinate in nanopure water | 30 | 5 | 2.32 | 48 |
| Dinonyl sulfosuccinate in nanopure water | 30 | 10 | 1.67 | 63 |
| Dinonyl sulfosuccinate in nanopure water + 100 ppm CaCl$_2$ | 30 | 5 | 0.58 | 63 |
| Dinonyl sulfosuccinate in tap water | 30 | 1 | 0.72 | 67 |
| Dinonyl sulfosuccinate in tap water | 30 | 2.5 | 0.19 | 91 |
| Dinonyl sulfosuccinate in tap water | 30 | 5 | 0.044 | 98 |
| Dinonyl sulfosuccinate in tap water | 30 | 10 | 0.022 | 99 |
| Dinonyl sulfosuccinate in tap water | 30 | 2 | 0.33 | 85 |
| Dinonyl sulfosuccinate in tap water (stock solution prepared in tap water) | 30 | 2 | 0.26 | 88 |
| Dioctyl sulfosuccinate in tap water | 30 | 2 | 1.55 | 30 |
| Southern Tissue White Water (W.W) | 30 | — | 0.51 | |
| Dinonyl sulfosuccinate in W.W | 30 | 1 | 0.038 | 95 |
| Southern Tissue White Water | 5 | — | 0.51 | |
| Dinonyl sulfosuccinate in W.W | 5 | 1 | 0.005 | 99 |
| Southern Tissue White Water (W.W) | 5* | — | 1.01 | |
| Dinonyl sulfosuccinate in W.W | 5* | 1 | 0.073 | 93 |
| Dinonyl sulfosuccinate in W.W | 5* | 0.5 | 0.24 | 76 |
| Dioctyl sulfosuccinate in W.W | 5* | 1 | 0.87 | 14 |

*Only the tape coupon was immersed in the solution

These results clearly indicate that of the dialkyl sulfosuccinate surfactants tested, the dinonyl sulfosuccinate exhibited the best performance as reflected by its ultra-low peel force. The present inventors anticipate that blends of dioctyl and didecyl sulfosuccinates would also be effective. Furthermore, the efficacy increases significantly when this surfactant is used together with calcium ions, compared to sodium ions.

DESCRIPTION OF FIELD OBSERVATIONS

To demonstrate the feasibility of the present invention under actual paper mill conditions, 5 ppm of a branched dinonylsulfosuccinate was fed into the fan pump of a southern tissue mill for a period of 7 days. During the length of the trial, "stickies" deposition on the paper machine and dry-end rewinder was reduced to levels significantly below those typically seen on the machine. The deposition was greatly minimized in all areas of the machine, including the felts, press section and dry-end rewinder. The rewinder was the area of the machine that was the most accessible and, therefore, most carefully monitored for stickies deposition. Over the course of the 7 day trial the rewinder presses never needed to be cleaned. However, upon cessation of the product feed, the rewinder presses rapidly (two reels of paper or less) became covered with stickies and solvent cleaning of the presses was necessary in order to avoid ripping the tissue as it was passed through the rewinder.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the deposition of organic contaminants from pulp in pulp and papermaking systems consisting essentially of adding to said pulp an effective deposition inhibiting amount of a blend of dioctyl sulfosuccinate and didecyl sulfosuccinate having a weight/weight ratio of about 2:1 to 4:1.

2. The method as claimed in claim 1 wherein said blend of dioctyl sulfosuccinate and didecyl sulfosuccinate are added in an amount ranging from 0.5 parts to about 150 parts per million parts pulp.

3. The method as claimed in claim I wherein said organic contaminants are stickies deposits.

4. The method as claimed in claim I wherein said organic contaminants are pitch deposits.

5. A method for inhibiting the deposition of organic contaminants from pulp on the surfaces of papermaking machinery and equipment in pulp and papermaking systems comprising spraying onto said surfaces an effective deposition inhibiting amount of an anionic surfactant selected from the group consisting of a dinonyl sulfosuccinate anionic surfactant, and a blend of dioctyl sulfosuccinate and didecyl sulfosuccinate anionic surfactant.

6. The method as claimed in claim 5 wherein said dinonyl sulfosuccinate and said blend of dioctyl sulfosuccinate and didecyl sulfosuccinate are sprayed on the surfaces in an amount ranging from about 0.5 parts to about 150 parts per million parts pulp.

7. The method as claim 5 in claims wherein said organic contaminants are stickies deposits.

8. The method as claimed in claim 5 wherein said organic contaminants are pitch deposits.

9. The method as claimed in claim 5 further comprising spraying onto said surfaces when said anionic surfactant is dinonyl sulfosuccinate a multivalent cation in solution with said surfactant.

10. The method as claimed in claim 9 wherein said multivalent cation is selected from the group consisting of calcium, magnesium and barium.

11. The method as claimed in claim 5 wherein said surfaces are selected from the group consisting of the wire, press felts, press rolls, and dryer cans.

* * * * *